United States Patent [19]

Takei

[11] Patent Number: 5,647,245

[45] Date of Patent: Jul. 15, 1997

[54] DRIVE APPARATUS HAVING A BALL SCREW USING ULTRASONIC MOTORS CONCENTRIC WITH ITS NUTS

[75] Inventor: Seiji Takei, Kanagawa, Japan

[73] Assignee: Nippon Thompson Co., Ltd., Tokyo, Japan

[21] Appl. No.: 423,853

[22] Filed: Apr. 18, 1995

[30] Foreign Application Priority Data

Apr. 18, 1994 [JP] Japan .................. 6-104806

[51] Int. Cl.$^6$ .................. F16H 25/12; H01L 41/08
[52] U.S. Cl. .................. 74/424.8 B; 310/323
[58] Field of Search .................. 74/424.8 B, 459; 310/323, 328

[56] References Cited

U.S. PATENT DOCUMENTS 4,739,212  4/1988  Imasaka et al. .................. 310/323
5,053,670  10/1991  Kosugi .................. 310/328
5,136,201  8/1992  Culp .................. 310/328

FOREIGN PATENT DOCUMENTS

5 332 416  12/1993  Japan .................. 74/424.8 B

Primary Examiner—Charles A. Marmor
Assistant Examiner—Mary Ann Battista
Attorney, Agent, or Firm—Sughrue, Mion, Zinn, Macpeak & Seas

[57] ABSTRACT

A drive apparatus equipped with a ball screw and a plurality of nuts achieves compact size while maintaining output. The above-mentioned effect is obtained by employing ultrasonic motors, concentric with the nuts and ballscrews, which are flat and able to maintain a high output, for driving the nuts.

11 Claims, 7 Drawing Sheets

DRIVE APPARATUS HAVING A BALL SCREW USING ULTRASONIC MOTORS CONCENTRIC WITH ITS NUTS

BACKGROUND OF THE INVENTION

1. Field of the Invention

The present invention to a drive apparatus equipped with a ball screw.

2. Description of the Prior Art

Figure 1:
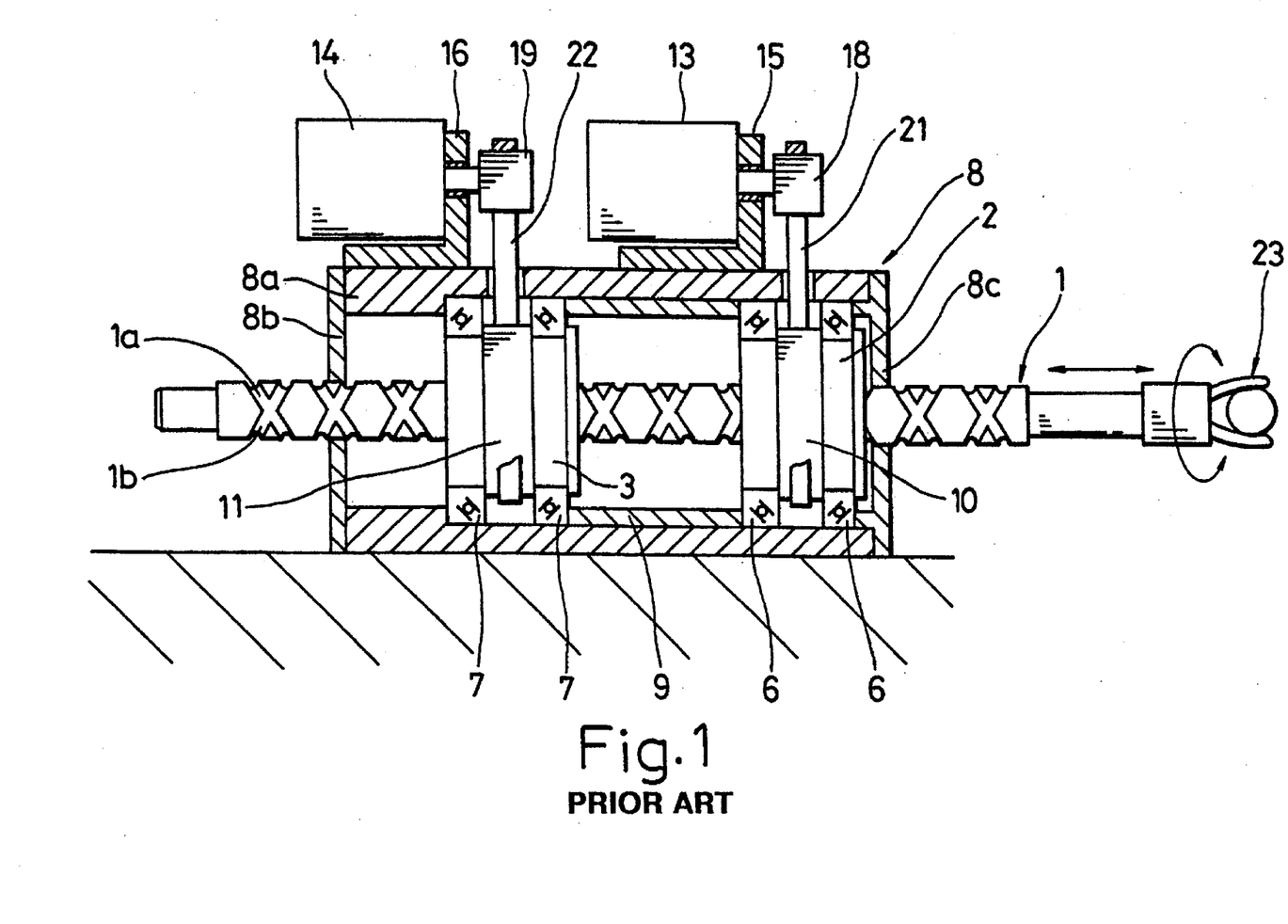
FIG. 1 is a front view, including a partial cross-section, of a drive apparatus of the prior art.

An example of this type of drive apparatus of the prior art is disclosed in Utility Model Laid-Open Publication No. 3-47787, a schematic drawing of which is shown in FIG. 1. As shown in the drawing, said drive apparatus is equipped with screw shaft 1, having left and right screw grooves 1a and 1b such that they are mutually intersecting, two nuts 2 and 3 which fit loosely onto said screw shaft 1 and are provided with ball circulating paths (not shown) corresponding to each of said screw grooves 1a and 1b, respectively, and a plurality of balls (not shown) arranged and contained within said ball circulating path which circulate accompanying relative rotation of said screw shaft 1 and nuts 2 and 3.

The above-mentioned nuts 2 and 3 are able to rotate freely as a result of being supporting at both their ends by two ball bearings 6 and 7, respectively. Furthermore, each of said ball bearings 6 and 7 is supported by support member 8 composed of body 8a and covers 8b and 8c. An outer ring collar 9 serves to prevent displacement of the outer rings of ball bearings 6 and 7.

Timing pulleys 10 and 11 are respectively fixed in the centers of the above-mentioned nuts 2 and 3. In addition, two stepping motors 13 and 14 are attached to the upper portion of support member 8 by means of attachment brackets 15 and 16, and timing pulleys 18 and 19 are fit onto the output shafts of each of said stepping motors 13 and 14. Timing belts 21 and 22 are wrapped between mutually corresponding timing pulleys 10 and 18 and mutually corresponding timing pulleys 11 and 19, respectively.

In this drive apparatus, as shown in the drawing, robot hand 23 to be driven is attached to the end of, for example, screw shaft 1. As a result of operating both stepping motors 13 and 14 and suitably changing the directions of rotation and rotating speeds of each nut 2 and 3, backward and forward movement, rotational movement as well as movement combining these can be performed as desired by the robot hand 23 via screw shaft 1. The relationship of movement between nuts 2 and 3 and screw shaft 1 is as shown below.

| Difference in rotating speeds between both nuts | No difference | No difference | Different rotating speeds |
|---|---|---|---|
| Direction of rotation of both nuts | Same direction | Opposite direction | Same direction |
| State of movement of screw shaft | Rotation at that position | Forward and backward movement only, no rotation | Forward and backward movement while rotating |

In this drive apparatus, since forward and backward movement, rotational movement and their compound movements of robot hand 23 to be driven can be performed by only controlling the rotation of two nuts 2 and 3, the structure of the apparatus is simple, and there are many locations at which parts can be shared, thus offering the advantage of reduced costs and so forth.

However, adequate results have yet to be obtained with respect to the problem of reducing the size of the apparatus, which has recently become increasingly important.

SUMMARY OF THE INVENTION

In consideration of the above-mentioned problems of the prior art, the object of the present invention is provide a drive apparatus that achieves compact size while maintaining output.

The present invention is a drive apparatus comprising: a screw shaft wherein left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that rotatably support each of said nuts; and driving devices able to individually rotate and drive each of said nuts; wherein, each said driving device comprises an ultrasonic motor that includes a vibrator provided concentrically with said nuts on the side of said supporting mechanism, a piezoelectric element coupled to said vibrator that vibrates said vibrator, and a moving body provided on the side of said nut so as to join said vibrator.

In the drive apparatus having this structure, both nuts are suitably rotated and driven by the operation of flat ultrasonic motors, thus enabling the screw shaft to perform forward and backward movement, rotational movement and combinations of these movements.

DESCRIPTION OF THE PREFERRED EMBODIMENTS

The following provides an explanation of the preferred embodiments of the present invention with reference to the attached drawings. First, an explanation is provided of a drive apparatus of a first embodiment.

Figure 2:
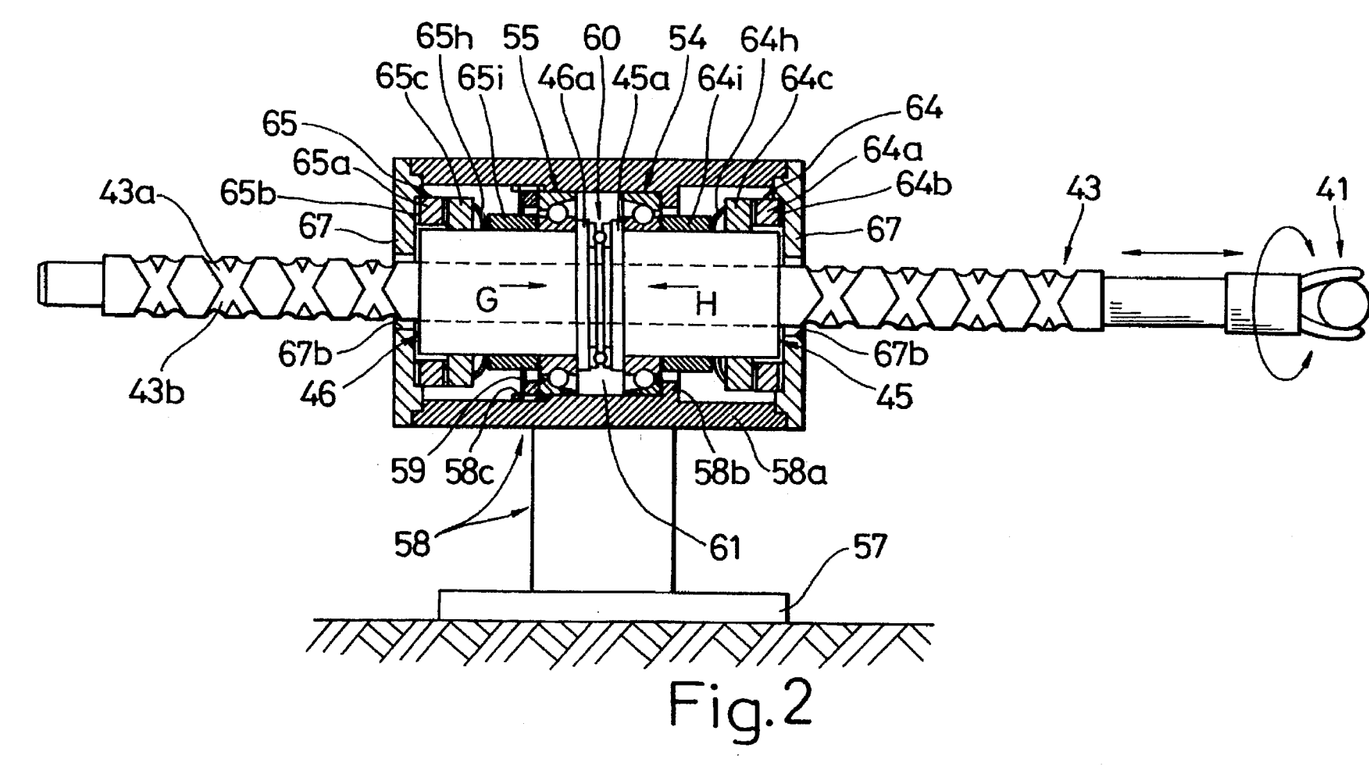
FIG. 2 is a front view, including a partial cross-section, of a drive apparatus of a first embodiment of the present invention.
Figure 3:
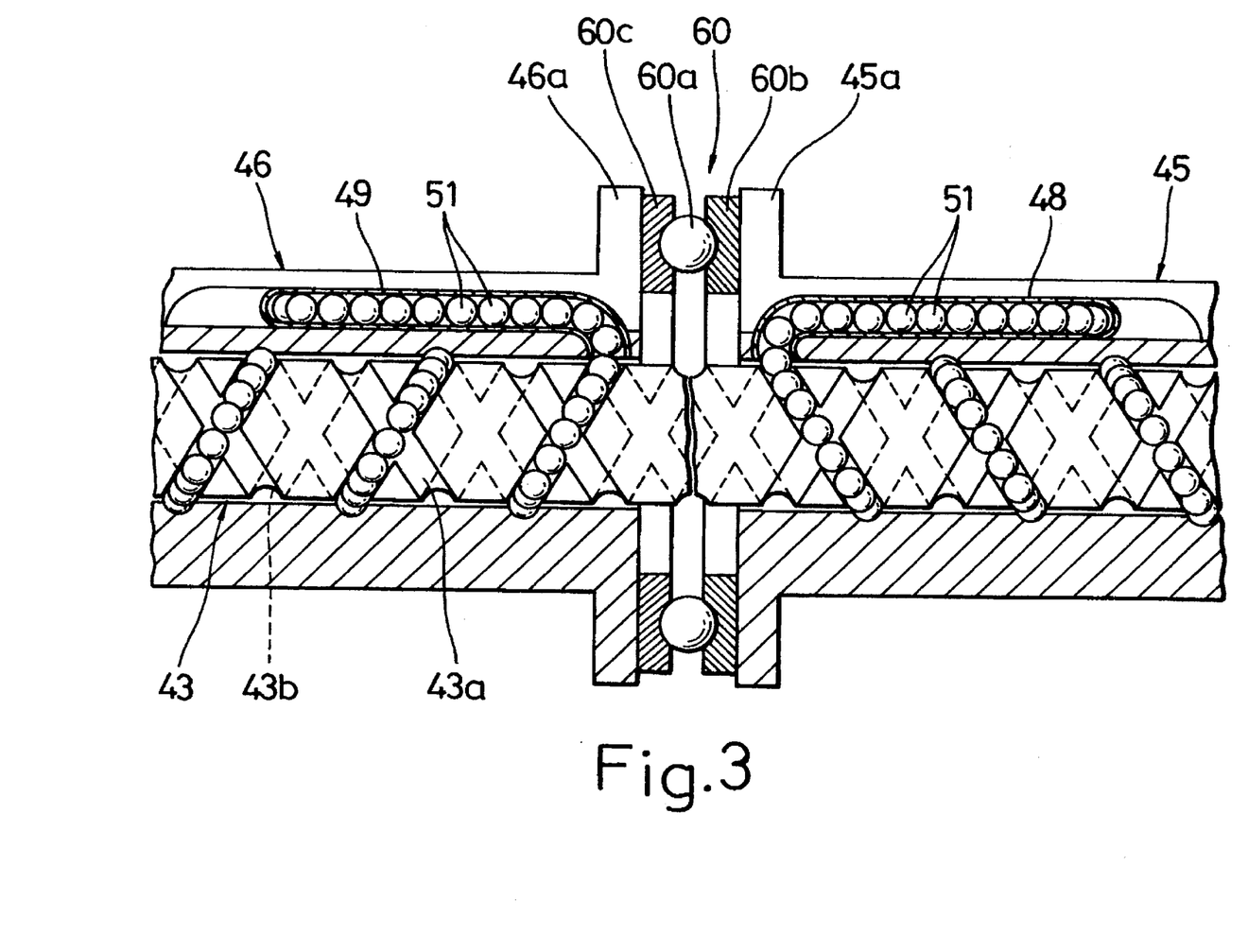
FIG. 3 is a longitudinal cross-sectional view of a portion of the drive apparatus shown in FIG. 2.

As shown in FIG. 2, the drive apparatus as claimed in the present invention is equipped with a single screw shaft 43 to which a driven object in the form of robot hand 41 is attached to one end, and a ball screw composed of two nuts 45 and 46, respectively formed into roughly the shape of a cylinder, and which are fit loosely onto said screw shaft 43. Left and right screw grooves 43a and 43b are formed in said screw shaft 43 such that they are mutually intersecting. As shown in FIG. 3, ball circulating paths corresponding to each of said screw grooves 43a and 43b are respectively formed in both nuts 45 and 46 by providing each with return tubes 48 and 49 and so forth. A plurality of balls 51 are arranged and contained within these ball circulating paths so that said balls 51 circulate accompanying relative rotation of screw shaft 43 and nuts 45 and 46.

Both of the above-mentioned nuts 45 and 46 are respectively supported by single row, angular radial ball bearings 54 and 55 in the vicinity of their mutually opposing ends as shown, for example, in FIG. 2. In addition, these radial ball bearings 54 and 55 are supported inside cylindrical support 58a formed on a support member in the form of bracket 58 fixed on base 57. More specifically, as shown in FIG. 2, both said radial ball bearings 54 and 55 are arranged so that the sides given by the contact angle due to the angular shape of each are facing each other. Circular projection 58b is formed at a prescribed site on the inner circumference of the above-mentioned support 58a, and the outer ring of one of the radial ball bearings, radial ball bearing 54, makes contact with this projection 58b. In addition, female threaded portion 58c is formed on the opposite side from said projection 58b between both radial ball bearings 54 and 55 on the inner circumference of said support 58a, and lock nut 59 screws onto said female threaded portion 58c, while the outer ring of the other radial ball bearing, radial ball bearing 55, makes contact with said lock nut 59. In addition, flanges 45a and 46a are formed on the mutually opposing ends of both nuts 45 and 46, and each inner ring of both radial ball bearings 54 and 55 makes contact with said flanges 45a and 46a. Furthermore, the above-mentioned bracket 58 along with both radial ball bearings 54 and 55 are generically referred to as a support mechanism in the sense that they support both nuts 45 and 46 while allowing them to rotate freely.

As is also clear from FIG. 3, both nuts 45 and 46 are arranged mutually approaching each other, and their ends are joined while allowing them to rotate freely relative to each other by means of, for example, flat back free type thrust ball bearing 60. More specifically, as is clear from FIG. 3, each of two bearing washers 60b and 60c, in the shape of a circular, flat plate and positioned on both sides of balls 60a of said thrust ball bearing 60, is fixed to the end surfaces of nuts 45 and 46 by, for example, welding. Furthermore, a structure wherein both nuts 45 and 46 are joined while mutually approaching each other in this manner is possible by forming the left and right screw grooves 43a and 43b in a mutually intersecting state.

As a result of employing this structure, each of said nuts 45 and 46 as well as the bearing structure that supports them while allowing them to rotate freely can be made compact in size, particularly in the axial direction of each nut 45 and 46. Furthermore, the end surfaces of nuts 45 and 46 may be joined directly in the form of a sliding bearing without providing the above-mentioned thrust ball bearing 60. However, the relative rotation of both nuts 45 and 46 is extremely smooth as a result of juxtapositioning thrust ball bearing 60 in this manner.

However, in a structure wherein the ends of two nuts 45 and 46 are joined by means of thrust ball bearing 60 as described above, it is desirable to apply in advance prescribed axial loads as shown with arrows G and H in FIG. 2 to prevent defective operation caused by even a slight amount of play between balls 60a and bearing washers 60b and 60c of said thrust ball bearing 60. Angular radial ball bearings 54 and 55 described above are employed for receiving the reaction of the radial load as well as this applied axial load. Moreover, each of the sides given by the contact angle resulting from the angular shape is arranged so as to be facing each other. Although various other arrangements can be considered for simultaneously bearing a radial load and axial load, using the above-mentioned arrangement these loads can be borne simply by providing two angular radial ball bearings. Consequently, the number of parts is reduced. Moreover, since both radial ball bearings 54 and 55 are provided in compact form in proximity to the mutually opposing ends of nuts 45 and 46, the structure of the apparatus can be simplified and made more compact. Furthermore, as was previously described, the above-mentioned axial load is applied as a result of the inner and outer rings of both radial ball bearings 54 and 55 being pushed in the axial direction by flanges 45a and 46a of nuts 45 and 46, the above-mentioned projection 58a of support 58a, and lock nut 59. Thus, since outer ring collar 9, like that juxtapositioned between ball bearings 6 and 7 in the drive apparatus of the prior art shown in FIG. 1, is not required, the number of parts is further reduced, thus achieving simplification and reduced size of the structure of the apparatus. In addition, in FIG. 2, together with a lubricant such as grease (not shown) filling space 61 demarcated by the above-mentioned support 58a, nuts 45 and 46, and both radial ball bearings 54 and 55, a prescribed sealing (not shown) is performed to prevent leakage of said lubricant from said space 61 as well as infiltration of dust and debris from the outside.

A driving device is provided that rotates and drives both of the above-mentioned nuts 45 and 46. The following provides an explanation of this driving device.

As shown in FIG. 2, ultrasonic motors 64 and 65, which are able to separately drive the above-mentioned nuts 45 and 46, are provided corresponding to each of said nuts 45 and 46, and both of said ultrasonic motors 64 act as the above-mentioned driving device. Each of said ultrasonic motors 64 and 65 are provided in the following manner. Since the ultrasonic motors 64 and 65 are identical, a detailed explanation is only provided for ultrasonic motor 65 that rotates and drives one of the nuts, nut 46. An explanation relating to ultrasonic motor 64 that drives the other nut, nut 46, is omitted. However, in FIG. 2, those constituent members equipped on ultrasonic motor 64, for which an explanation is omitted, that correspond to the constituent members equipped on ultrasonic motor 65, for which an explanation is provided, are indicated as 64a, 64b, 64c and so forth using the same letters of the alphabet, namely a, b, c and so forth.

Figure 4:
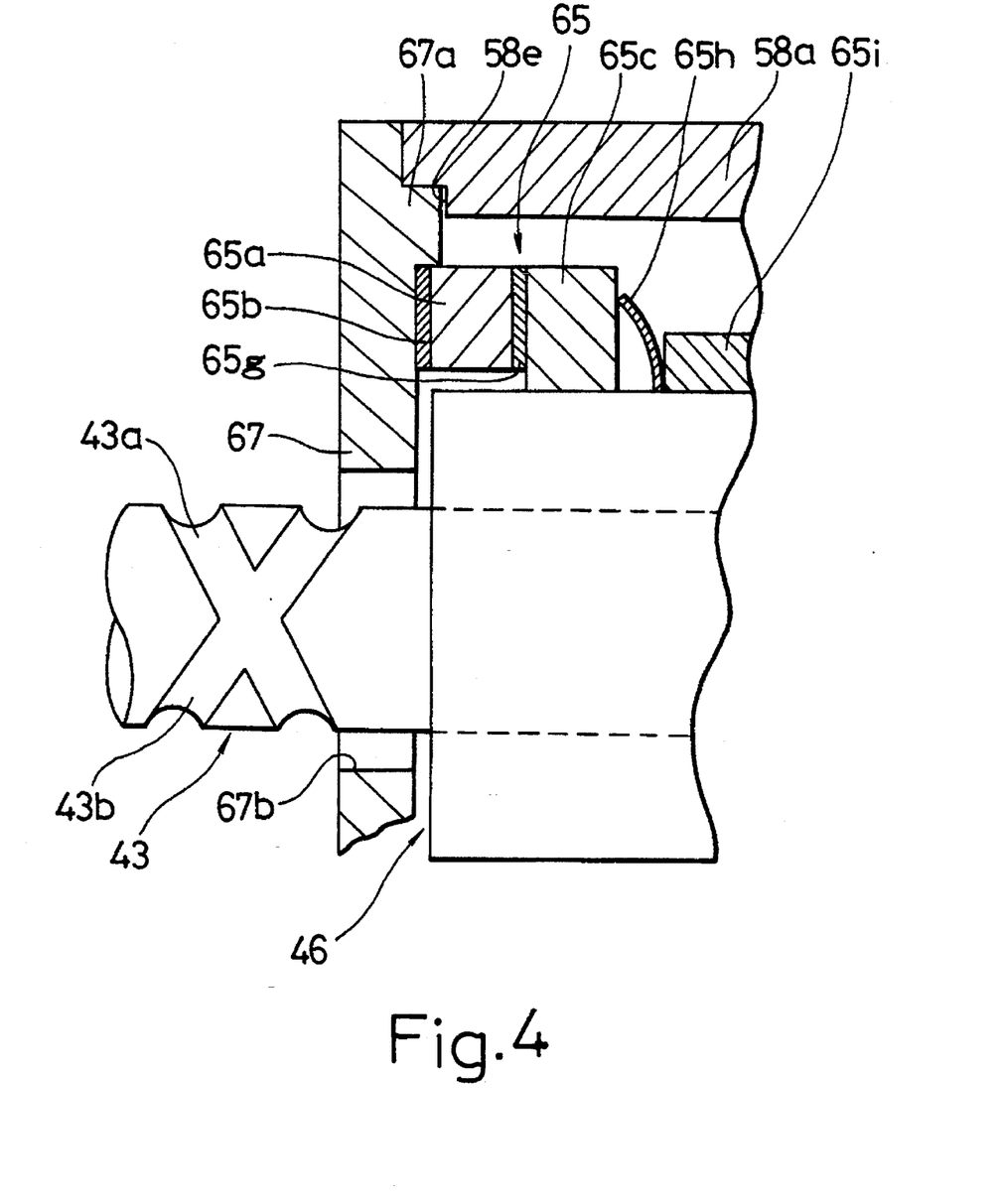
FIG. 4 is an enlarged view of a portion of the drive apparatus shown in FIG. 2.

As shown in FIGS. 2 and 4, this ultrasonic motor 65 has stator 65a formed in the shape of a ring that acts as a vibrator, piezoelectric element 65b coupled over roughly the entire surface of one end of said stator 65a that vibrates said stator 65a, and rotor 65c, a moving body, that is similarly formed in the shape of a ring and provided to mate with the other end of said stator 65a.

Stator 65a is attached to a pair of covers 67 provided by means of a seal not shown to block the openings on both ends of cylindrical support 58a of bracket 58, and is concentrically arranged and loosely fit on nut 46. In addition, rotor 65c is fit onto nut 46. Furthermore, as is clear from FIG. 4, countersunk portion 58e is formed in the opening of the above-mentioned cylindrical support 58a, and boss 67a formed in said cover 67 fits into said countersunk portion 58e. In addition, the previously described screw shaft 43 is inserted through opening 67b formed in the center of said cover 67.

The following provides an explanation of the details of the above-mentioned stator 65a and rotor 65c along with their operating principle.

Figure 5:
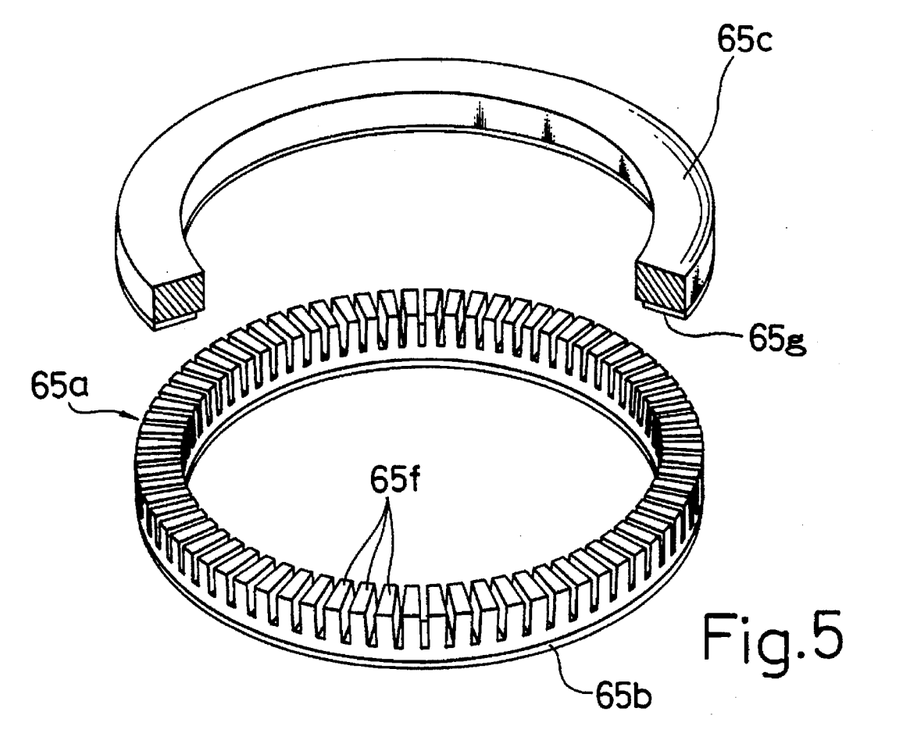
FIG. 5 is an exploded perspective view, including a partial cross-section, of a portion of an ultrasonic motor of the drive apparatus shown in FIG. 2.

As shown in FIG. 5, a large number of teeth 65f are formed at an equal pitch along the circumference of the side of stator 65a that joins with rotor 65c. Slider 65g (also see FIG. 4), in the shape of a flat plate that makes sliding contact with these teeth 65f, is adhered over its entire circumference to said rotor 65c.

The operating principle is as described below.

Figure 6:
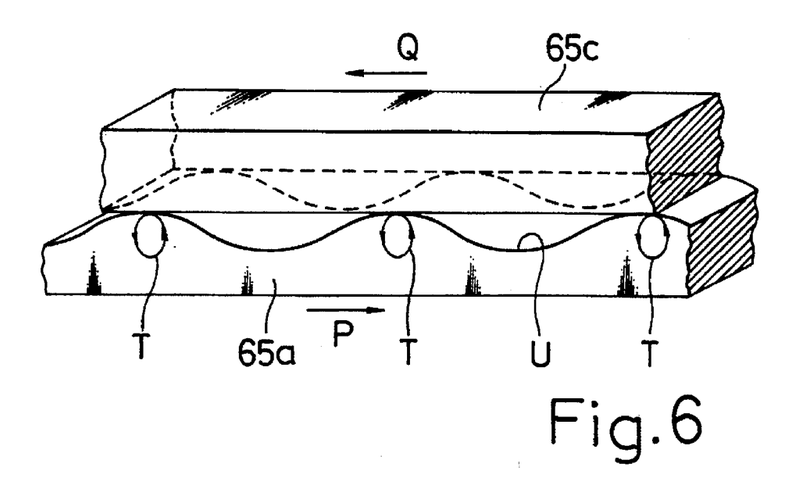
FIG. 6 is a schematic drawing for explaining the operating principle of the ultrasonic motor shown in FIG. 5.

When the required ultrasonic vibrations are generated by applying current to piezoelectric element 65b coupled to the back surface of stator 65a, said stator 65a is excited at its characteristic frequency, and a wave-like vibration mode, represented with reference numeral U in FIG. 6, is produced on the side of said stator 65a contacting rotor 65c. This wave is a progressive wave moving, for example, in the direction of arrow P. At this time, the crest of said wave demonstrates an oval motion like that indicated with reference numeral T, while rotor 65c, making contact with stator 65a, operates in the direction of arrow Q due to friction. Piezoelectric element 65b and previously described slider 65g are omitted from FIG. 6, however. If the supply of electrical power to piezoelectric element 65b is interrupted, rotor 65c comes to a complete stop immediately due to friction. In addition, switching between forward and reverse rotation can be performed easily by changing the orientation of the applied voltage and current.

Here, it is necessary that rotor 65c and stator 65a not simply make contact, but rather be pressed against each other in order to effectively provide driving force to rotor 65c based on ultrasonic vibrations as described above, and this is done in the present embodiment. The following provides an explanation of the structure to achieve this pressed contact. However, since the two ultrasonic motors 64 and 65 are the same with respect to this pressed contact as well, an explanation is only provided for one of the ultrasonic motors, ultrasonic motor 65. An explanation of the other ultrasonic motor, ultrasonic motor 64, is omitted. However, in FIG. 2, those constituent members provided for this press contact equipped on ultrasonic motor 64, for which an explanation is omitted, that correspond to the constituent members provided for this press contact equipped on ultrasonic motor 65, for which an explanation is provided, are indicated as 64h, 64i and so forth using the same letters of the alphabet, namely h, i and so forth.

In FIGS. 2 and 4, the above-mentioned rotor 65c is able to slide in the axial direction of nut 46. A spring member that acts as a means of applying force, in this case disc spring 65h, is arranged on the side opposite the side of said rotor 65c that contacts stator 65a, and rotor 65c is pressed against stator 65a by said disc spring 65h. By obtaining the desired amount of force applied by suitably setting the spring constant of this disc spring 65h and deflecting it by the required amount, the driving force of rotor 65c can be set as desired. Furthermore, as shown in FIGS. 2 and 4, collar 65i is juxtapositioned between the inner ring of radial ball bearing 55 that supports nut 46 and said disc spring 65h, and this prevents said radial ball bearing 55 from being subjected to the reaction of said disc spring 65h. By juxtapositioning a force applying device in the form of disc spring 65h between the inner ring of radial ball bearing 55 and rotor 65c in this manner, in addition to the inherent function of said radial ball bearing 55 as a bearing, since its inner ring is also used as a member that receives the reaction of the press contact force of the disc spring 65h, a reduction in the number of parts can also be achieved.

As is shown in FIG. 2 and as was previously described, both nuts 45 and 46 are arranged mutually approaching each other, and their ends are joined while allowing them to rotate freely relative to each other by means of thrust ball bearing 60. Consequently, each of said nuts 45 and 46 as well as the bearing structure that supports them while allowing them to rotate freely, including both radial ball bearings 54 and 55, can be made compact in size. In this case, compact size is achieved in the axial direction of both nuts 45 and 46.

As shown in FIG. 2, the above-mentioned ultrasonic motors 64 and 65 are provided corresponding to the ends of the sides opposite from the sides at which the above-mentioned nuts 45 and 46 are mutually joined. The nuts 45 and 46, both radial ball bearings 54 and 55, and both of said ultrasonic motors 64 and 65 are collectively contained in compact fashion within cylindrical support 58a of bracket 58, and combining this arrangement with the previously described structure achieves a compact size for the entire drive apparatus.

Furthermore, in addition to being compact, the ultrasonic motor employed as the driving device also has the advantages described below.

(1) It is able to obtain lower speeds and higher torque in comparison with electromagnetic motors.

(2) Since it has dropping characteristics similar to those of direct current motors while also having good response, it can be used for high-precision speed control and position control.

(3) Since the stator and rotor are joined firmly together, due to the frictional force generated, the holding torque when still is large thereby eliminating the need for an electromagnetic brake and so forth.

(4) Since there are no coils like those found in electromagnetic motors and the structure is simple, it can be reduced in price thereby giving it excellent volume productivity.

(5) The design has a large degree of freedom, and can be housed in compact fashion within the structure of an apparatus, as previously described.

(6) It does not operate based on the principle of magnetic action, does not have any magnetic effects on its surroundings, and is not affected by magnetic fields.

In the drive apparatus having the above-mentioned structure, by separately operating both ultrasonic motors 64 and 65 and suitably changing the direction of rotation and rotating speed of each nut 45 and 46, screw shaft 43, and thus robot hand 41, can be made to perform forward and backward movement, rotational movement and their compound movements as described. Furthermore, the motion relationship between both nuts 45 and 46 and screw shaft 43 is the same as the drive apparatus of the prior art indicated in FIG. 1. Since movement is performed in the manner of Table 1 shown in the explanation of said apparatus of the prior art, an explanation of that movement is omitted.

Figure 7:
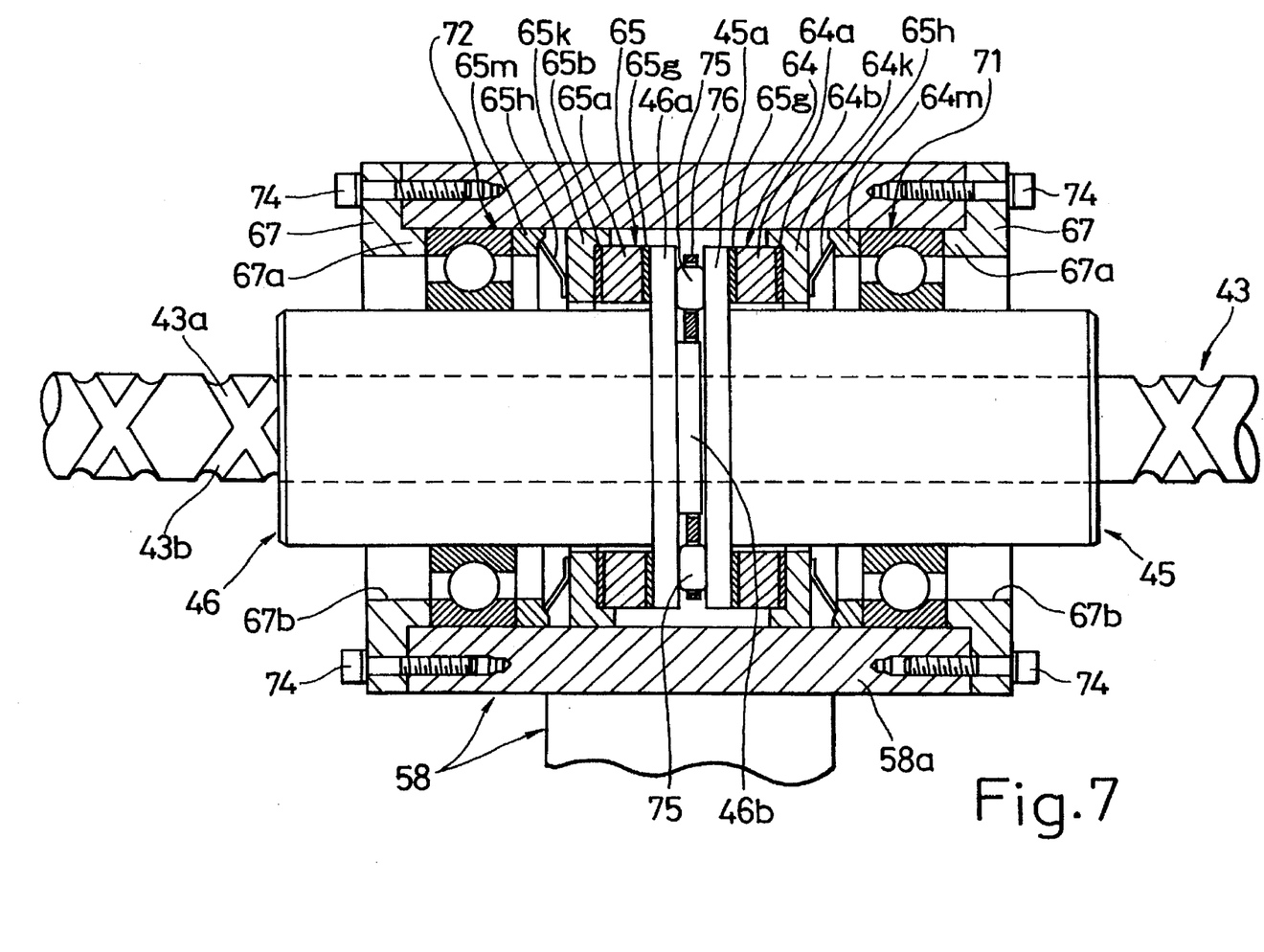
FIG. 7 is a longitudinal cross-sectional view of the essential portion of a drive apparatus of a second embodiment of the present invention.

Next, an explanation is provided of a drive apparatus according to a second embodiment of the present invention based on FIG. 7. Since this drive apparatus is composed in the same manner as the drive apparatus to the first embodiment of the present invention described above with the exception of those portions explained below, an explanation of the entire apparatus is omitted. Instead, the explanation is limited to only the essential portion. In addition, in the following explanation, the same reference numerals are used for those constituent members that are the same as or correspond to the constituent members of the drive apparatus as the first embodiment of the present invention.

As shown in the drawing, in said drive apparatus, both nuts 45 and 46 are arranged to be mutually approaching and joined, and are supported by single row, radial ball bearings 71 and 72 at a location other than at their mutually joining ends, and in this case, roughly in the center in the axial direction. In addition, these radial ball bearings 71 and 72 are supported inside cylindrical support 58a which is in turn supported by a support member in the form of bracket 58. Both ultrasonic motors 64 and 65 are provided in proximity to the mutually joining ends of the above-mentioned nuts 45 and 46.

Since both nuts 45 and 46, both radial ball bearings 71 and 72, and both ultrasonic motors 64 and 65 are all contained in compact fashion within cylindrical support 58a of bracket 58, compact size is achieved for the entire drive apparatus.

The following provides a detailed description of the above-mentioned ultrasonic motors 64 and 65. Furthermore, since the ultrasonic motors 64 and 65 are identical, a detailed explanation is only provided for ultrasonic motor 65 that rotates and drives one of the nuts, nut 46. An explanation relating to ultrasonic motor 64 that drives the other nut, nut 45, is omitted. However, in FIG. 7, those constituent members equipped on ultrasonic motor 64, for which an explanation is omitted, that correspond to the constituent members equipped on ultrasonic motor 65, for which an explanation is provided, are indicated as 64a, 64b, 64c and so forth using the same letters of the alphabet.

As shown in the drawing, flanges 45a and 46a are respectively formed on the mutually joining ends of each nut 45 and 46, and with respect to one of the nuts, nut 46, slider 65g is mounted on the side opposite the side of flange 46a joined with said flange 45a. Stator 65a is joined to said slider 65g. This flange 46a serves to act as the moving body of ultrasonic motor 65. Thus, since a portion of the nut is being used as a moving body, the number of parts can be reduced. Said stator 65a is attached to receiver 65 together with piezoelectric element 65b coupled to its back side. This receiver 65k is formed in the shape of a ring and fixed in the direction of rotation within cylindrical support 58a of bracket 58 while able to slide freely in the axial direction. Consequently, a vibrator in the form of stator 65a is able to move in the axial direction of nut 46 with respect to said nut 46.

Disc spring 65h is arranged on the above-mentioned receiver 65k on the side opposite the above-mentioned stator 65a and piezoelectric element 65b, and force is applied to said stator 65a together with said receiver 65k, thus causing them to be pressed against the moving body in the form of the above-mentioned flange 46a. Furthermore, collar 65m is juxtapositioned between the outer ring of radial ball bearing 72 that supports nut 46 and said disc spring 65h, and this bears the reaction of said disc spring 65h. As a result of juxtapositioning a force applying device in the form of disc spring 65h between the outer ring of radial ball bearing 72 and stator 65a in this manner, in addition to the inherent function of said radial ball bearing 72 as a bearing, since its outer ring is also used as a member that receives the reaction of the press contact force, a reduction in the number of parts can also be achieved. Furthermore, the outer ring itself of this radial ball bearing 72 engages with boss 67a formed on cover 67 on the side opposite the side that engages with the above-mentioned collar 65m, and this receives the reaction of disc spring 65h. In addition, said cover 67 is fastened to cylindrical support 58a of bracket 58 by bolt 74.

The following provides a description of the joining of the above-mentioned nuts 45 and 46.

As shown in FIG. 7, a plurality of rolling elements in the form of rollers 75 are juxtapositioned along the circumferential direction between each flange 45a and 46a formed on both nuts 45 and 46. In addition, circular cage 76 is provided that retains said rollers 75. Retaining portion 46b is formed on one of the nuts, nut 46, that protrudes in the axial direction, and the movement of said cage 76 in the radial direction is restricted because said retaining portion 46b fits inside this cage 76. As a result of employing this bearing arrangement in the axial direction, relative rotation of both nuts 45 and 46 is performed smoothly. Furthermore, since flanges 45a and 46a of both nuts 45 and 46 are used as bearing washers of the thrust bearing, the number of parts can be reduced in comparison with the drive apparatus shown in FIGS. 2 through 6.

Furthermore, in each of the drive apparatuses of the first and second embodiments, screw grooves 43a and 43b formed in screw shaft 43 are mutually intersecting. Although both nuts 45 and 46 are arranged to be mutually approaching based on this arrangement, the following arrangement can also be employed.

Figure 8:
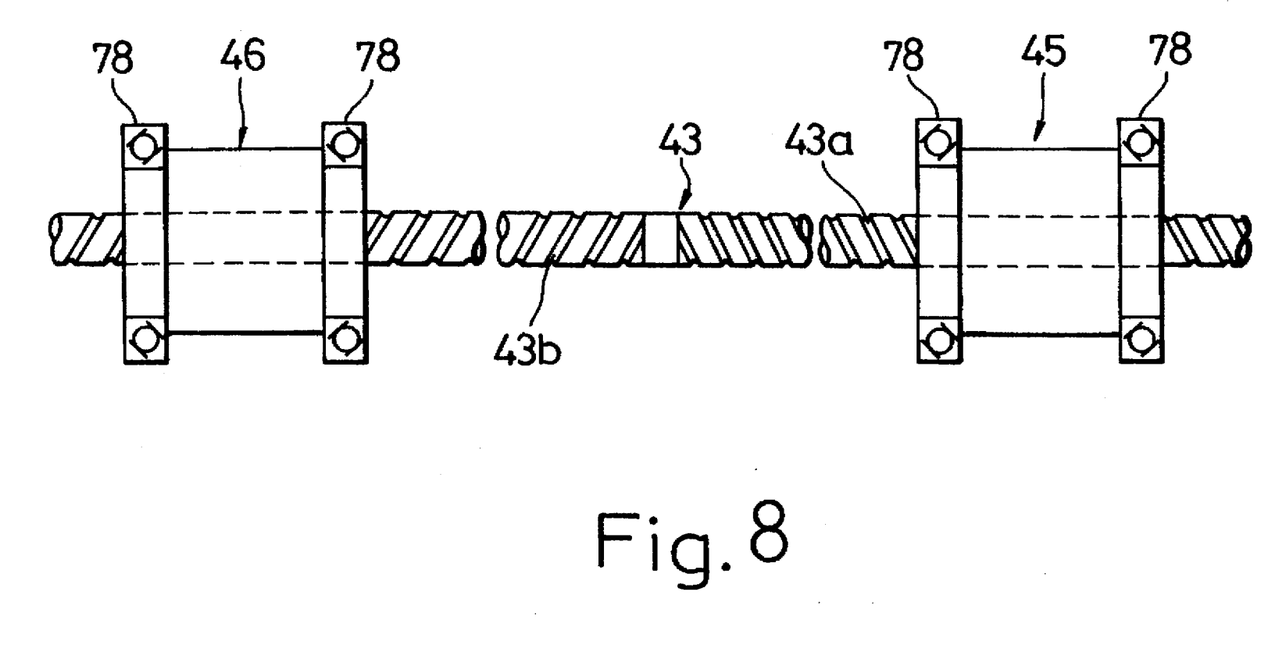
FIG. 8 is a front view of the essential portion of a drive apparatus of a third embodiment of the present invention.

As shown in FIG. 8, screw grooves 43a and 43b are formed in screw shaft 43 divided into left and right screw grooves with the border between them being located roughly in the center. Each nut 45 and 46 is arranged separated from each other to respectively correspond to one of said screw grooves 43a and 43b. Furthermore, in said drawing, reference number 78 indicates a bearing for attaching both said nuts 45 and 46 to a bracket not shown while allowing them to rotate freely, and in this case, indicates an angular radial ball bearing.

Furthermore, the pitches of the two types of screw grooves 43a and 43b formed in screw shaft 43 indicated in each of the above-mentioned embodiments may be equal or different. However, where the pitches are different, it becomes necessary to change control of the speed of rotation of both nuts 45 and 46.

In addition, although two nuts are provided in each of the above-mentioned embodiment, their number can be suitably chosen according to the need to increase driving force and so forth.

The present invention is not limited to the embodiments previously described, but can be realized by combining even a portion of the structure of each of the embodiments with each other.

As explained above, in the drive apparatus according to the present invention, a driving device, which rotates and drives a plurality of nuts provided to enable forward and backward movement, rotational movement and compound movements of these using a screw shaft, is composed of an ultrasonic motor that includes a vibrator concentrically provided with said nut on a supporting mechanism, a piezoelectric element coupled to said vibrator that vibrates said vibrator, and a moving body provided on the side of said nut so as to contact said vibrator. Since this high output flat ultrasonic motor is employed for the driving device, compact size is achieved while ensuring high output.

In addition, in the drive apparatus according to the present invention, at least either the above-mentioned vibrator or moving body is able to move in the axial direction of the above-mentioned nut with respect to said nut, and is pressed against said nut by a force applying device. By suitably setting the force applied by said force applying device, the present invention offers the advantage of enabling the driving force of said moving body to be set as desired.

In addition, in the drive apparatus according to the present invention, left and right screw grooves are formed in a screw shaft such that they mutually intersect, each of the above-mentioned nuts are arranged to be mutually approaching based on this, their corresponding ends are joined while able to rotate freely relative to each other and the above-mentioned ultrasonic motor is provided on the other end of each said nut. Because each nut is joined to the other at one of its ends, each of said nuts as well as the bearing structure that supports them while allowing them to rotate freely is made compact in size, and compact size is achieved particularly in the axial direction of each nut. In addition, by employing an ultrasonic motor arranged on the other side of each nut, each nut, their bearing structure and each ultrasonic motor can be assembled in a compact fashion, thus reducing the size of the entire drive apparatus.

Moreover, in the drive apparatus according to the present invention, by juxtapositioning a thrust bearing between the mutually joining portions of each of the above-mentioned nuts, relative rotation of each nut is extremely smooth.

In addition, in the drive apparatus according to the present invention, the supporting mechanism that supports each of the above-mentioned nuts while allowing them to rotate freely has a bearing that supports each of said nuts in proximity to their mutually joining ends and at least in the radial direction, and a supporting member that supports said bearing. Since the bearings are arranged compactly in the vicinity of the mutually joining ends of each nut, the structure of the apparatus is simplified and made more compact.

In addition, in the drive apparatus according to the present invention, the above-mentioned bearing that supports each nut is composed of an angular radial bearing. Specifically, where the corresponding ends of each nut are joined by means of, for example, a thrust ball bearing as previously described, it is preferable to provide the required axial load in advance to prevent defective operation caused by even a slight amount of play in the balls of said thrust ball bearing and the bearing washer. An angular radial bearing is employed to receive the reaction of the axial load applied together with a radial load, and is arranged so that the sides given by each angular shape in the form of a contact angle are mutually facing. Although various other constitutions can be considered for simultaneously bearing a radial load and an axial load, using the above-mentioned arrangement, these loads can be borne simply by providing only two angular radial bearings, thus further reducing the number of parts.

In addition, in the drive apparatus according to the present invention, the force applying device that causes press contact between the above-mentioned vibrator and moving body is composed of a spring member, and said spring member is juxtapositioned between the bearing that supports the above-mentioned nuts and said vibrator or said moving body. Therefore, in addition to the inherent function of said bearing as a bearing, since it is also used as a member that receives the reaction of the press contact force, a reduction in the number of parts is also achieved.

Moreover, in the drive apparatus according to the present invention, flanges may be formed on the above-mentioned nuts, and said flanges are used as the moving bodies of ultrasonic motors. Accordingly, the number of parts can be reduced, thus reducing the size of the apparatus.

In addition, in the drive apparatus according to the present invention, when each of the above-mentioned nuts is arranged to mutually approaching and joined to the other nut, flanges are formed on the mutually joining end of each of said nuts, and rolling elements are juxtapositioned between said flanges. Consequently, together with the relative rotation of each nut being performed smoothly, since said flanges act as bearing washers of a thrust bearing, there is no particular need to provide bearing rings, thus achieving a reduction in the number of parts.

In addition, in the drive apparatus according to the present invention, the above-mentioned ultrasonic motors can be provided in proximity to the mutually joined ends of each of said nuts, and said nuts can be supported by bearings at locations other than at said joining ends. As a result, each of said nuts, bearings and ultrasonic motors can be collectively housed in a compact fashion, thereby reducing the size of the entire drive apparatus.

What is claimed is:

1. A drive apparatus comprising:

a screw shaft wherein left and right screw grooves are formed so as to mutually intersect;

a plurality of nuts fit loosely onto said screw shaft and provided with ball circulating paths corresponding to each of said screw grooves, respectively, each of said nuts having a first end and a second end; said nuts being arranged in pairs, said first ends of both said nuts of each pair of said nuts being joined together so as to rotate freely relative to each other;

a plurality of balls arranged and contained within said ball circulating paths that circulate accompanying relative rotation of said screw shaft and said nuts;

supporting mechanisms that support each of said nuts so as to be able to rotate freely; and driving devices able to individually rotate and drive each of said nuts;

wherein each said driving device comprises an ultrasonic motor that includes a vibrator provided concentrically with said nuts on said supporting mechanism, a piezoelectric element coupled to said vibrator that vibrates said vibrator, and a moving body provided on said nut so as to contact said vibrator, and wherein a thrust bearing is juxtapositioned between the nuts of each pair of said nuts.

2. The drive apparatus as set forth in claim 1 wherein at least one of either said vibrator or said moving body is able to move in the axial direction of said nut with respect to said nut, and said vibrator and said moving body are pressed against each other by a force applying device.

3. The drive apparatus as set forth in claim 1 wherein a flange is formed on each of said nuts, and said flange functions as said moving body.

4. The drive apparatus as set forth in claim 1 wherein said ultrasonic motors are provided on said second ends of said nuts.

5. The drive apparatus as set forth in claim 1 wherein said ultrasonic motors are provided in proximity to said first ends of each of said nuts, and said supporting mechanisms have bearings that support each of said nuts at locations other than said first ends of said nuts, and support members that support said bearings.

6. The drive apparatus as set forth in claim 1 wherein said supporting mechanisms have bearings that support each of said nuts in proximity to said first ends of said nuts and support said nuts at least in the radial direction, and support members that support said bearings.

7. The drive apparatus as set forth in claim 6 wherein the bearings that support said nuts are composed of angular radial bearings.

8. The drive apparatus as set forth in claim 6 wherein said vibrator and said moving body are pressed against each other by a force applying device composed of a spring member, and said spring member is juxtapositioned between the bearing that supports each of said nuts and said vibrator or said moving body.

9. A drive apparatus comprising:

a screw shaft wherein left and right screw grooves are formed so as to mutually intersect;

a plurality of nuts fit loosely onto said screw shaft and provided with ball circulating paths corresponding to each of said screw grooves, respectively, each of said nuts having a first end and a second end; said nuts being arranged in pairs, said first ends of both said nuts of each pair of said nuts being joined together so as to rotate freely relative to each other;

a plurality of balls arranged and contained within said ball circulating paths that circulate accompanying relative rotation of said screw shaft and said nuts;

supporting mechanisms that support each of said nuts so as to be able to rotate freely; and driving devices able to individually rotate and drive each of said nuts;

wherein each said driving device comprises an ultrasonic motor that includes a vibrator provided concentrically with said nuts on said supporting mechanism, a piezoelectric element coupled to said vibrator that vibrates said vibrator, and a moving body provided on said nut so as to contact said vibrator, and wherein said ultrasonic motors are provided on said second ends of said nuts.

10. A drive apparatus comprising:

a screw shaft wherein left and right screw grooves are formed so as to mutually intersect;

a plurality of nuts fit loosely onto said screw shaft and provided with ball circulating paths corresponding to each of said screw grooves, respectively, each of said nuts having a first end and a second end; said nuts being arranged in pairs, said first ends of both said nuts of each pair of said nuts being joined together so as to rotate freely relative to each other;

a plurality of balls arranged and contained within said ball circulating paths that circulate accompanying relative rotation of said screw shaft and said nuts;

supporting mechanisms that support each of said nuts so as to be able to rotate freely; and driving devices able to individually rotate and drive each of said nuts;

wherein each said driving device comprises an ultrasonic motor that includes a vibrator provided concentrically with said nuts on said supporting mechanism, a piezoelectric element coupled to said vibrator that vibrates said vibrator, and a moving body provided on said nut so as to contact said vibrator, wherein said supporting mechanisms have bearings that support each of said nuts in proximity to said first ends of said nuts and support said nuts at least in the radial direction, and support members that support said bearings, and wherein said vibrator and said moving body are pressed against each other by a force applying device composed of a spring member, and said spring member is juxtapositioned between the bearing that supports each of said nuts and said vibrator or said moving body.

11. A drive apparatus comprising:

a screw shaft wherein left and right screw grooves are formed so as to mutually intersect;

a plurality of nuts fit loosely onto said screw shaft and provided with ball circulating paths corresponding to each of said screw grooves, respectively, each of said nuts having a first end and a second end; said nuts being arranged in pairs, said first ends of both said nuts of each pair of said nuts being joined together so as to rotate freely relative to each other;

a plurality of balls arranged and contained within said ball circulating paths that circulate accompanying relative rotation of said screw shaft and said nuts;

supporting mechanisms that support each of said nuts so as to be able to rotate freely; and driving devices able to individually rotate and drive each of said nuts;

wherein each said driving device comprises an ultrasonic motor that includes a vibrator provided concentrically with said nuts on said supporting mechanism, a piezoelectric element coupled to said vibrator that vibrates said vibrator, and a moving body provided on said nut so as to contact said vibrator, wherein flanges are formed on said first ends of each of said nuts, and a rolling element is juxtapositioned between said flanges.

* * * * *